3,494,881
REGENERATION OF STRONG ACID CATION EXCHANGE RESINS WITH SULFURIC ACID CONTAINING A HALIDE COMPOUND

Leo F. Ryan, Westwood, and Stanley J. Ciuba, Scotch Plains, N.J., assignors, by mesne assignments, to Union Tank Car Company, Chicago, Ill., a corporation of Delaware
No Drawing. Filed Nov. 9, 1967, Ser. No. 681,898
Int. Cl. B01j 1/04
U.S. Cl. 260—2.2                                8 Claims

ABSTRACT OF THE DISCLOSURE

The formation of a calcium sulfate precipitate in the regeneration of strong acid, cationic, hydrogen-form ion exchange resin particles with sulfuric acid is prevented by introducing a halide ion-producing compound into the regeneration vessel along with the acid. Very small concentrations, as low as 0.01 molar, of halide ion may be employed to achieve improved results. It is essential that the cation in the halide ion-producing compound produce a soluble sulfate compound.

---

The present invention relates to improvements in the regeneration of ion exchange resins, and more specifically to an improved method for regenerating strong acid, cationic, hydrogen-form ion exchange resin particles with sulfuric acid.

The exhaustion of hydrogen-form strong cationic exchange resins takes place in the demineralization of water by the exchange of undesirable ions in water, such as calcium and magnesium, for hydrogen ions that are released by the resin. During the regeneration process, which is generally carried on in a column, the exhausted resin particles are treated with an acid to replace the ions removed from the water, resubstituting hydrogen ions in their place.

While any strong acid may theoretically be used for performing the regeneration, sulfuric acid is most desirable from an economic standpoint. However, this acid has the unfortunate effect of producing precipitation of calcium sulfate. This precipitate both contaminates the resin being regenerated and clogs the regeneration apparatus, making the use of this acid very difficult.

Many attempts have been made to find a satisfactory way to regenerate ion exchange resin particles with sulfuric acid. One method that has been successful involves the initial substitution of non-precipitating ions, such as sodium ions, for the calcium ions in the resin. The sodium ions are then displaced with surfuric acid, avoiding the formation of calcium sulfate precipitates. Unfortunately, this method is time-consuming in that it requires two steps, and also risks contamination of the resin with sodium ions.

Another method that has been employed involves the use of a very dilute solution of surfuric acid in performing the regeneration. While calcium sulfate precipitation may be avoided, this method is inefficient and time-consuming.

It has now been found that the precipitation of calcium sulfate during the regeneration of hydrogen-form ion exchange resin particles may be diminished or avoided by introducing a halide ion-producing compound into the regeneration vessel along with the sulfuric acid. The halide ion-producing compound must be one that ionizes in water and has a cation that produces a soluble sulfate compound.

Only a very small concentration of halide ions is required to achieve the results of the present invention. In processes where the precitation of calcium sulfate would normally occur, as little as 0.01 mole of halide ion per liter of liquid in the regeneration vessel is required. The precise amount required will, of course, depend upon several factors including the concentration of the sulfuric acid regenerant, the amount of calcium retained by the resin, and, to a minor degree, the speed with which the regenerant is passed through the resin particles.

When a halide salt such as sodium chloride is employed, care must be taken that too high a concentration is not used, as this may result in the introduction of sodium or other cations, rather than hydrogen ions, into the resin particles. When halogen acids are employed, on the other hand, there is no upper limit except that dictated by economics, since hydrogen ions, of course, do not contaminate a hydrogen-form resin. Therefore, for halogen salts, the upper operating limit will generally be about 0.5 molar, and preferably about 0.1 molar. While there is no theoretical upper limit for the halogen acids, it is preferred that they be employed in a range of about 0.01 to 2.0 molar.

It is of course essential that the halide ion-producing compound and the sulfuric acid be in the vessel in the presence of one another. In the preferred embodiment, the two are mixed together before being introduced into the vessel. This avoids zones where either the sulfuric acid or the halide is present in the absence of the other. There is therefore a minimum likelihood of calcium sulfate precipitation.

The concentration of sulfuric acid in the column is important, and is generally dictated by the rate at which it is passed through the column and the amount of calcium retained by the resin. While calcium sulfate is most soluble in the more concentrated sulfuric acid solutions, this increased solubility is usually more than offset by the increased rate of regeneration of the resin, causing the more rapid formation of calcium sulfate. In most cases, therefore, the likelihood of calcium sulfate precipitation is increased at higher acid concentrations. On the other hand, the use of very low concentrations requires too much time to regenerate the resin. If the concentration of the sulfuric acid is below about 0.25 normal, precipitation problems are not generally encountered. The present invention makes possible the use of higher concentrations where calcium sulfate precipitation would normally occur.

Suitable halide salts for use in the present invention include those that ionize in water and have soluble sulfate salts. That is, they must not form precipitates when used together with sulfuric acid. Most preferred are the halogen acids and the ammonium and alkali metal salts of halogens. Of the alkali earths, beryllium and magnesium can be used; however, calcium, strontium, and barium form insoluble sulfates, and would aggravate rather than solve the problems of sulfate precipitation. Other suitable halide salts include those of iron (ferrous), nickel, copper (cupric) and zinc.

The present invention may be used in conjunction with any particulate, strong acid, cationic, hydrogen-form ion exchange resin that can be regenerated with sulfuric acid. Included are resins of the divinylbenzene-styrene copolymer type, the acrylic type, the sulfonated coal type, and the phenolic type.

The following examples are intended to illustrate the present invention, and should not be construed as limitative, the scope of the invention being determined by the appended claims.

The examples were performed in an ion exchange regeneration column designed for use in an integrated water treatment system including a service column, a regeneration column, and a wash column. The regeneration column included a columnar tank having resin feed means at the top for introducing exhausted ion exchange resins, and resin withdrawal means at the bottom for removing regenerated resin. In normal operation, during regeneration, water and sulfuric acid were introduced near the bottom, and exhausted regenerant, containing ions removed from the resin, was withdrawn near the top of the column. Before being passed to the drain, the exhausted regenerant passed through a surge tank which retained a volume of the solution.

During introduction of resin, liquid was withdrawn from the column at a point near the bottom, while the tank was charged with the exhausted resin from the reservoir at the top. In order to maintain the column filled with liquid, and thus aid in the introduction of resin, exhausted regenerant flowed back into the column from the previously mentioned surge tank.

EXAMPLE 1

The above-described apparatus was used to regenerate hydrogen-form cationic exchange resin of the divinylbenzene-styrene copolymer type. The resin had been used in a service column to treat water containing ions, of which 75% were calcium ions and 25% were sodium ions. The exhausted resin contained 1.725 equivalent of calcium ions per liter of resin and 0.125 equivalent of sodium ions per liter of resin.

The resin was regenerated with 0.35 normal sulfuric acid, at a "regeneration ratio" of 1.6. The regeneration ratio is a factor expressing the total amount of acid used compared to the theoretical minimum required to displace a desired amount of ions in the resin. The acid solution removed 0.375 equivalent of calcium ion per liter and 0.125 equivalent of sodium ion per liter. Since the regeneration ratio was 1.6, 1.6 times the 0.500, or 0.8 equivalent of acid per liter of resin were passed through the column. In carrying out the regeneration, the periodic appearance of calcium sulfate was observed, forming a severe risk of contamination or clogging during commercial operation.

EXAMPLE 2

Example 1 was repeated except that sufficient hydrochloric acid was added to the sulfuric acid to give a 0.02 molar concentration of hydrochloric acid. No calcium sulfate precipitation was observed during the regeneration process.

EXAMPLE 3

A procedure similar to that described in Example 1 was carried out, except that sufficient sodium chloride was introduced into the regenerant to give a sodium chloride concentration of 0.01 molar. While some slight precipitation of calcium sulfate was observed, it was not nearly so severe as in Example 1, and would not interfere with most commercial operations since it would be carried off with the regenerant.

While the embodiments described herein are at present considered to be preferred, it will be understood that various modifications and improvements may be made therein as fall within the true spirit and scope of the invention.

We claim:
1. A method for inhibiting the precipitation of calcium sulfate in the regeneration of calcium containing, strong acid, cationic, hydrogen-form ion exchange resin particles with sulfuric acid in a vessel comprising: introducing a halide ion-producing compound into said vessel containing said resin in the presence of said sulfuric acid, said compound having a cation producing a water-soluble sulfate, in an amount sufficient to produce a halide ion concentration in said vessel of about 0.01 to 2.0 molar.

2. The method of claim 1 wherein said halide ion-producing compound is hydrochloric acid.

3. The method of claim 1 wherein said halide ion-producing compound is a salt and wherein the concentration of said salt in said vessel is about 0.01 to 0.5 molar.

4. The method of claim 3 wherein said salt is a chloride.

5. The method of claim 1 wherein said sulfuric acid and said halide ion-producing compound are mixed together before being introduced into said vessel.

6. The method of claim 5 wherein said halide ion-producing compound is hydrochloric acid.

7. The method of claim 5 wherein said halide ion-producing compound is a salt and wherein the concentration of said salt in said vessel is about 0.01 to 0.5 molar.

8. The method of claim 7 wherein said salt is a chloride.

References Cited

UNITED STATES PATENTS 2,683,695  7/1954  Dwyer et al. _____ 260—2.2
3,019,199  1/1962  Chanmugam _____ 260—2.2

FOREIGN PATENTS 1,033,224  6/1966  Great Britain.

WILLIAM H. SHORT, Primary Examiner

M. GOLDSTEIN, Assistant Examiner

U.S. Cl. X.R.
210—33, 30